Sept. 10, 1957  J. S. KESSLER  2,805,837
BUTTERFLY VALVES
Filed Nov. 19, 1952

INVENTOR.
Joseph S. Kessler,
BY Morsell & Morsell
ATTORNEYS.

United States Patent Office 2,805,837
Patented Sept. 10, 1957

2,805,837

BUTTERFLY VALVES

Joseph S. Kessler, Kenosha, Wis., assignor, by mesne assignments, to Ladish Co., Cudahy, Wis., a corporation of Wisconsin Application November 19, 1952, Serial No. 321,390

2 Claims. (Cl. 251—292)

This invention relates to improvements in butterfly valves, and more specifically to a butterfly type of shut-off valve.

Heretofore, whenever a shut-off valve was needed in a piping system, such valves as plug valves, gate valves or poppet valves were used because it was believed that a satisfactory seal could only be effected by these types of valves. Butterfly type valves have found wide application in the control of fluid flow, but heretofore there have been no satisfactory shut-off type butterfly valves available.

With the above in mind it is, therefore, a general object of the present invention to provide an improved butterfly valve which can maintain a satisfactory seal under substantially higher pressures than plug type valves of comparable size.

A further object of the invention is to provide an improved shut-off valve of the class described which is relatively simple in construction and which is substantially cheaper to manufacture than other types of valves of comparable size.

A further object of the invention is to provide an improved shut-off valve of the class described which requires no seat or shoulder in the tubular body in which it is mounted, said valve being capable of quick disassembly and easy cleaning.

A more specific object of the invention is to provide an improved butterfly valve having a grooved periphery in which a resilient sealing ring is positioned for effecting a sealing engagement with the surrounding sidewall of the valve body when the valve is in closed position.

A further object of the invention is to provide an improved shut-off valve which, when completely closed, is not easily opened by the pressure of fluid thereagainst usually encountered, and which when not completely closed is urged toward open position by said fluid pressure.

A further specific object of the invention is to provide an improved valve of the class described wherein the butterfly is elliptical in shape, having opposite faces which are offset from each other along a common longitudinal axis.

A further specific object of the invention is to provide an improved valve of the class described wherein the axis of rotation of the butterfly is normal to but offset laterally from the axis of the valve body and is normal to the longitudinal axis of the butterfly and offset laterally from the transverse axis of said butterfly.

A further object of the invention is to provide an improved valve of the class described which is strong and durable and which is well adapted for use in sanitary piping systems and food handling equipment.

With the above and other objects in view, the invention consists of the improved butterfly type shut-off valve and all of its parts and combinations, as set forth in the claims and all equivalents thereof.

In the drawing accompanying and forming a part of this specification, wherein is shown one complete embodiment of the preferred form of the invention, and wherein like characters of reference indicate the same parts in all of the views.

Figure 3:
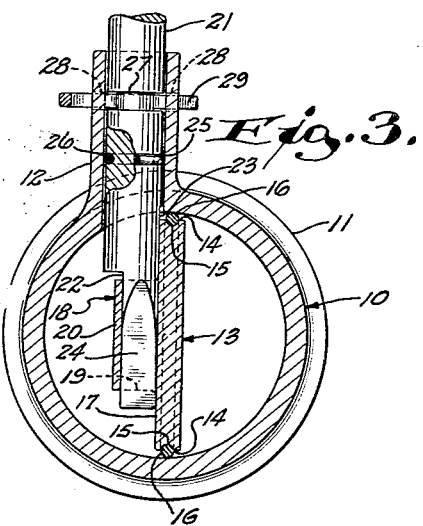
Fig. 3 is a sectional plan view taken approximately along the line 3—3 of Fig. 1.
Figure 4:
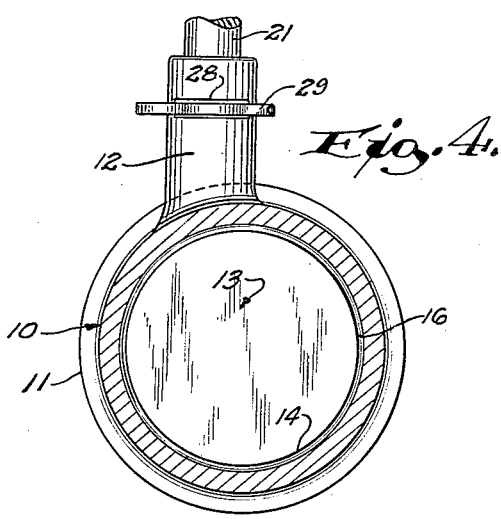
Fig. 4 is a sectional plan view taken approximately along the line 4—4 of Fig. 2.

Referring more particularly to the drawing, the numeral 10 indicates a tubular cylindrical valve body which may be provided at its opposite end portions with external threading 11. As shown in Figs. 3 and 4, the valve body 10 is formed with a tubular bearing boss 12 which projects outwardly substantially normal to the axis of the body 10 and is offset laterally from said axis.

Figure 1:
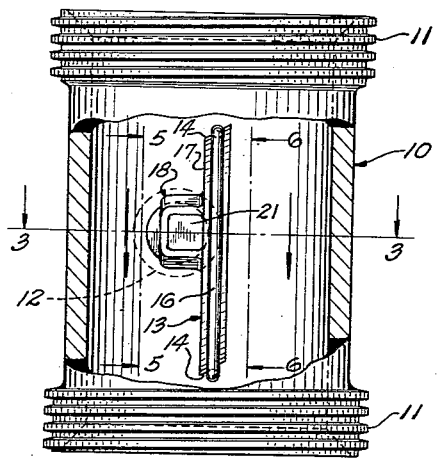
Fig. 1 is a side elevational view of the improved shut-off valve in open position, parts being broken away and in section.
Figure 2:
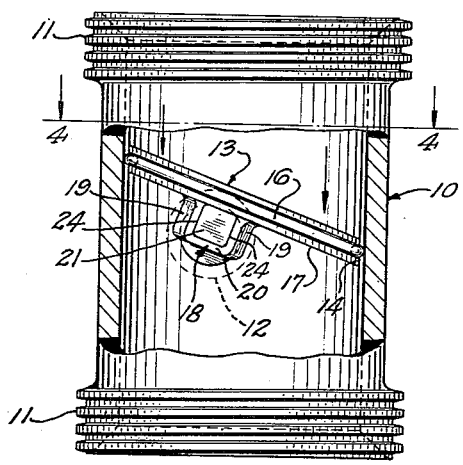
Fig. 2 is a view similar to Fig. 1, only showing the valve in its closed or shut-off position.
Figure 5:
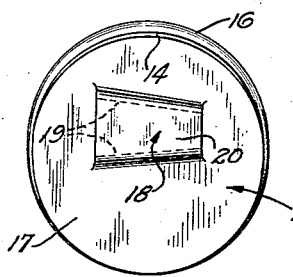
Fig. 5 is a side elevational view of one elliptical face of the butterfly valve member with the stem removed therefrom, as viewed along the line 5—5 of Fig. 1.
Figure 6:
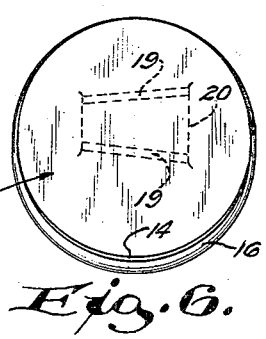
Fig. 6 is a side elevational view of the opposite elliptical face of the butterfly valve member, as viewed along the line 6—6 of Fig. 1.

Positioned within the valve body 10 is a butterfly type valve member 13 which is preferably elliptical in shape as shown in Figs. 5 and 6. The valve member 13, as shown in Figs. 1 and 2, is of parallelogram form in cross-section in the plane normal thereto along the longitudinal or major axis of said valve member. As shown in Fig. 3, the valve member 13 has a rectangular cross-sectional shape in the plane normal thereto along the transverse or minor axis. Fig. 3 also shows that the width of the valve member along its transverse axis is less than the inner diameter of the valve body 10.

The valve member has an annular edge surface 14 which lies in a cylindrical plane whose axis passes through the center of said valve member and which also lies in the plane normal to said member along the major axis thereof, said axis being disposed at an angle to said valve member. Figs. 2 and 4 show that when the valve member 13 is in closed position the edge surface 14 lies in a cylindrical plane spaced inwardly from and substantially coaxial with the inner surface of the valve body 10.

The annular edge surface 14 of the valve member 13 is formed with an annular groove 15 (Fig. 3) in which is positioned a resilient sealing ring 16 preferably of circular cross-sectional shape. The ring 16 is of such size that when the valve member 13 is in the position of Figs. 2 and 4, said ring forms a seal between said valve member and the inner wall of the valve body 10 around the entire periphery of the valve member.

The valve member 13 is formed on one face 17 with a boss 18 having a pair of converging side walls 19 normal to the face 17, and a wall 20 spaced from and parallel with the face 18. As shown in Figs. 1 and 5, the boss 18 is substantially parallel with the transverse or minor axis of the valve member 13 and is offset therefrom.

A cylindrical stem 21 is rotatably mounted in the bearing boss 12 and has its inner end projecting into the valve body 10. The inner end of stem 21 is cut away along one side, as at 22, and is cut away to a lesser extent along its opposite side, as at 23, to give the end of the stem a thickness substantially equal to the distance between the wall 20 and the face 17 of the valve member 13. The inner end of stem 21 is also formed with a pair of diverging faces 24 (Figs. 2 and 3), having the same angular and spacial relationship as the inner surfaces of walls 19 of boss 18. The inner end of stem 12 is removably positioned in the boss 18, as shown in Figs. 1 to 3, and is snugly received therein.

The stem 21 is formed with an annular groove 25 (Fig. 3) within the bearing boss 12, and a resilient sealing ring 26 is positioned in the groove 25 and forms a seal between the stem and the inner surface of said bearing boss. The stem 21 is also formed with an annular groove 27 outwardly of the groove 25. The bearing boss 12 is formed with a pair of spaced, diametrically opposite slots 28 therethrough (Figs. 3 and 4) which register with the annular groove 27 in the stem. A generally U-shaped retaining clip 29 is removably positioned in the slots 28 and groove 27 to prevent axial movement of the stem 21 while permitting rotation thereof.

In the use of the improved valve, the latter is preferably connected into a piping system in such a manner that the flow of fluid will be in the direction indicated by the arrows in Figs. 1 and 2. Since the valve member 13 is of the unbalanced type, the pressure of fluid thereagainst urges said valve member toward the full open position shown in Fig. 1 whenever the valve is partially open. When, however, the valve member 13 is rotated to the completely closed position of Fig. 2 where the sealing ring 16 seals off the valve body 10 around its entire periphery, fluid pressure from the direction indicated does not easily open the valve. In actual practice the improved valve maintains a good seal in shut-off position under pressures up to 200 pounds, whereas the maximum pressure at which a sanitary plug valve of comparable size can maintain a good seal is 30 pounds. The cost of the improved valve is substantially less than that of a sanitary plug valve of comparable size.

The improved valve can be quickly disassembled for cleaning by simply removing the retaining clip 29 and withdrawing the stem 21 through the bearing boss 12, thus permitting the valve member 13 to be lifted out of the valve body 10. Since no shoulders or valve seats are required in the improved valve, the valve body 10 has a smooth cylindrical inner wall which is readily cleaned. The improved valve has wide aplication as a shut-off valve and is particularly well adapted for use in sanitary piping systems.

Various changes and modifications may be made without departing from the spirit of the invention, and all of such changes are contemplated, as may come within the scope of the claims.

What I claim is:

1. In a valve having a tubular valve body with a straight cylindrical internal bore portion, a tubular boss projecting from said body in a direction transversely of the axis of said bore and eccentrically of said axis, said boss having one end open at the exterior and having an inner end opening providing a flush communication with the cylindrical bore, a butterfly type valve member movably mounted in said cylindrical bore and having a peripheral groove, a resilient sealing ring in said groove, said valve being movable between an open postion and a closed position at an oblique angle with respect to the axis of said bore of the valve body where further movement is prevented by engagement of the sealing ring with the bore proper and where the sealing ring sealingly engages said bore at one side of the inner end opening of the boss around its entire periphery, when the valve is in open position said sealing ring engaging said bore at one sde of the inner end opening of the boss at diametrically opposed portions only, an elongated sleeve offset from the center of the valve member and projecting from one face thereof and substantially parallel to said face, the interior of said sleeve being in alignment with said boss of the valve body, a valve stem rotatably mounted in the boss of the valve body and having one end projecting externally of the boss and its opposite end detachably engaged in said sleeve and extending in a plane parallel to the face of the valve member to serve as a common support and operating member, said engagement of the valve stem and the engagement of the valve member with the interior of the bore constituting the sole support for said valve member, and said valve member being pivotal in the bore on said diametrically opposed portions when the stem is rotated.

2. In a valve having a tubular valve body with a straight cylindrical internal bore portion, a tubular boss projecting from said body in a direction transversely of the axis of said bore and eccentrically of said axis, said boss having one end open at the exterior and having an inner end opening providing a flush communication with the cylindrical bore, a butterfly type valve member movably mounted in said cylindrical bore and formed with a peripheral groove, a resilient sealing ring in said groove and having in all positions of operation an elliptical external sealing periphery with a short diametric dimension and a long diametric dimension at right angles to said short dimension, said valve member being movable between an open position and a closed position at an oblique angle with respect to the axis of said bore of the valve body where further movement is prevented by engagement with the bore proper and where said sealing ring sealingly engages said bore at one side of the inner end opening of the boss around the entire periphery of said ring, when the valve is in open position said sealing ring engaging said bore at one side of the inner end opening of the boss at the diametrically opposed portions of said short dimension only, loop means offset from the center of the valve member and projecting from one face thereof, the interior of said loop means being in alignment with said boss of the valve body, a valve stem rotatably mounted in the boss of the valve body and having one end projecting externally of the boss and its opposite end detachably engaged in said loop means and extending in a plane parallel to the face of the valve member to serve as a common support and operating member, said engagement of the valve stem and the engagement of the sealing ring with the interior of the bore constituting the sole support for said valve member, and said valve member being pivotable in the bore on said diametrically opposed sealing ring portions of the short dimension of the valve member when the stem is rotated.

References Cited in the file of this patent

UNITED STATES PATENTS

| | | |
|---|---|---|
| 160,496 | Woodruff | Mar. 2, 1875 |
| 1,120,975 | Roderick | Dec. 15, 1914 |
| 1,188,462 | McCormack | June 27, 1916 |
| 1,490,039 | Spencer | Apr. 8, 1924 |
| 1,744,798 | Price | Jan. 28, 1930 |
| 1,849,152 | Payne | Mar. 15, 1932 |
| 2,355,017 | Stone | Aug. 1, 1944 |
| 2,412,330 | Glanz | Dec. 10, 1946 |
| 2,552,117 | Roswell | May 8, 1951 |

FOREIGN PATENTS

| | | |
|---|---|---|
| 613,700 | Germany | of 1935 |